(12) United States Patent  
Matusi

(10) Patent No.: US 6,169,718 B1  
(45) Date of Patent: Jan. 2, 2001

(54) DISK UNIT INCLUDING LOCKING PLATE AND SPRING FOR MOVING A DISK DRIVE FRAME BETWEEN FIRST AND SECOND POSITIONS

(75) Inventor: Tsutomu Matusi, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 08/931,281

(22) Filed: Sep. 16, 1997

(30) Foreign Application Priority Data

Sep. 20, 1996 (JP) .................................................. 8-249677

(51) Int. Cl.⁷ ............................ G11B 33/02; G11B 23/00
(52) U.S. Cl. ........................................... 369/75.1; 369/263
(58) Field of Search .................................. 369/75.1, 75.2, 369/77.1, 77.2, 263; 360/97.02, 97.03, 97.04; 312/7.1; 248/611

(56) References Cited

U.S. PATENT DOCUMENTS

| | | | | |
|---|---|---|---|---|
| 3,059,882 | * | 10/1962 | Staar | 248/561 |
| 4,849,958 | * | 7/1989 | Douwes et al. | 369/77.2 |
| 5,023,862 | * | 6/1991 | Kim | 369/215 |
| 5,142,522 | * | 8/1992 | Muramatsu et al. | 369/75.2 |
| 5,590,109 | * | 12/1996 | Ookawa et al. | 369/77.2 |
| 5,654,846 | * | 8/1997 | Wicks et al. | 360/97.01 |
| 5,659,530 | * | 8/1997 | Kurita | 369/77.2 |

* cited by examiner

Primary Examiner—Brian E. Miller  
Assistant Examiner—Kenneth W. Fields  
(74) Attorney, Agent, or Firm—McGinn & Gibb, P.C.

(57) ABSTRACT

A disk unit includes a disk drive frame, a chassis elastically secured to the disk drive frame, a locking plate, connected to the disk drive frame, for moving the disk drive to a locked position, and a spring, connected to the locking plate, for moving the disk drive frame to an unlocked position.

19 Claims, 8 Drawing Sheets

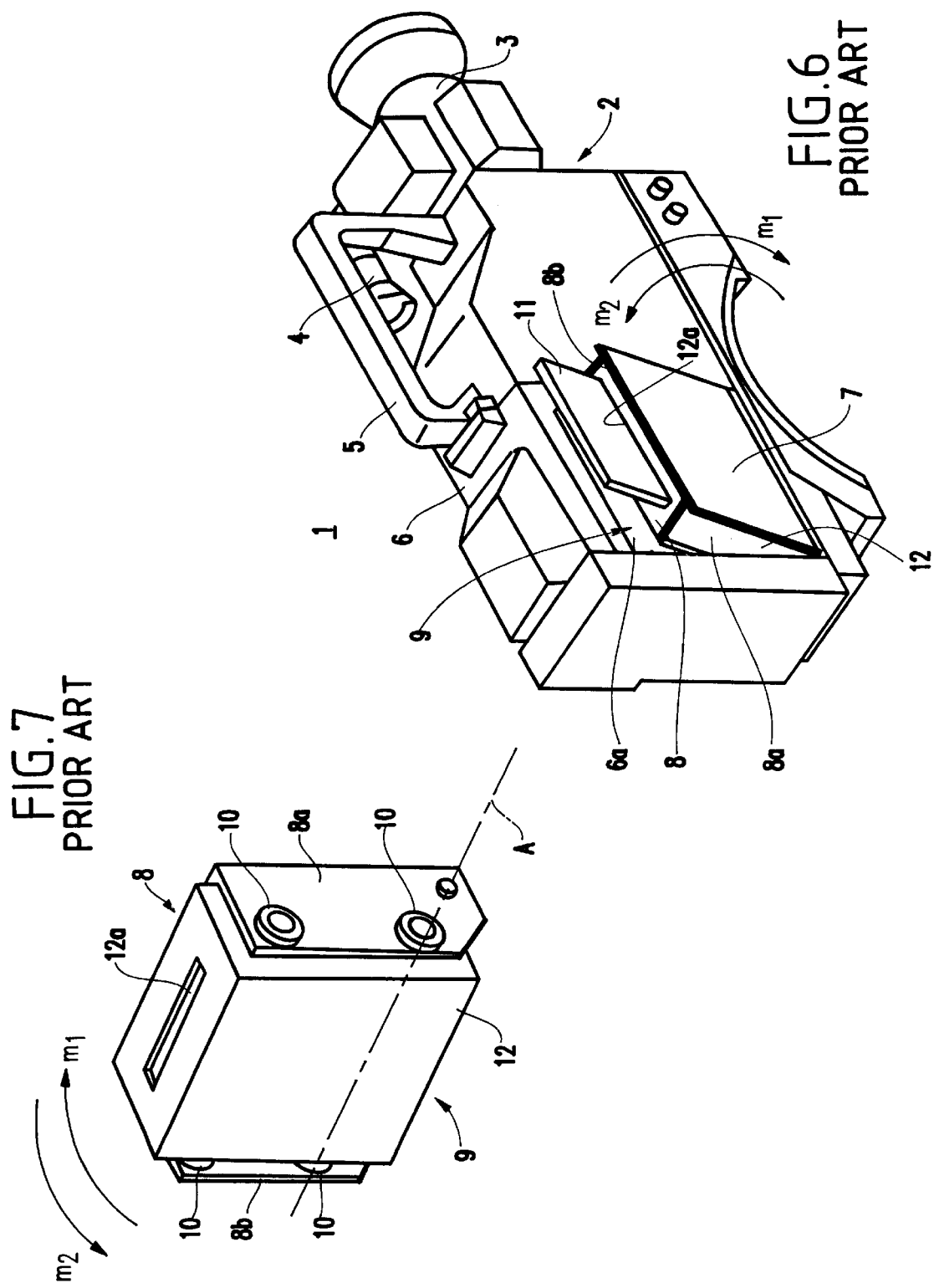

DISK UNIT INCLUDING LOCKING PLATE AND SPRING FOR MOVING A DISK DRIVE FRAME BETWEEN FIRST AND SECOND POSITIONS

BACKGROUND OF THE INVENTION

1. Field of the Invention

The present invention relates to a disk drive unit for recording and reproducing information to and from a recording medium, and more particularly to a locking plate within the disk unit for stabilizing insertion of the disk into the disk drive.

2. Description of the Related Art

A recording medium such as, for example, an optical disk unit, is generally used for writing and/or reading an information signal to and/or from the disk rotatably set in a disk cartridge. For example, a "min-disk system" including a loading mechanism is described in Nikkei Mechanical, No. 479, Apr. 29, 1996, pp. 64–67. Another type of optical recording system, namely a video camera using a magnetic tape, is described in "Development of 8 mm VCRs", Jun Hirai, *Technical Meeting of Industrial Precision Society*, Vol. 61; , No. 1, 1995.

Referring back to the optical disk unit, the disk unit comprises a cartridge loading mechanism having a cartridge holder for removably holding a disk cartridge, a disk table positioned under the cartridge loading mechanism to attract and hold an optical disk, a rotary drive mechanism having a spindle motor for driving the disk table at high speed, and an optical pickup device, positioned behind the rotary drive mechanism, having an objective lens.

In operation, the disk cartridge is moved to a predetermined cartridge loading position. An optical disk within the disk cartridge is rotated to the cartridge loading position (e.g., the disk loading position), and an information signal is written to and read from the optical disk.

Because the disk cartridge advantageously has a large memory capacity and superior accessibility, portability, and durability, the optical disk cartridge operates well with, for example, a portable video camera. However, the disk drive must be protected from vibrations and impacts, when recording or reproducing data to or from the cartridge.

As shown in prior art FIG. 6, an exemplary portable video camera 1 includes a camera body 2, a lens barrel 3, a viewfinder 4, and a carrying handle 5. The camera body 2 has a disk unit frame 6 and a cover 7 for pivotally opening or closing an aperture 6a of the disk unit frame 6. The disk unit frame 6 includes a pickup device (illustrated in FIG. 8 with reference numeral 14) and a printed circuit board (not illustrated). The cover 7 is connected to a main chassis (not illustrated), via hinges or the like, so as to be rotatable in the directions shown by arrows $m_1$ and $m_2$ about an axis line A, shown in FIG. 7.

A conventional disk unit uses a damper 10, such as an elastic insulator including a rubber grommet, for elastically securing a sub-chassis 8, as shown in FIGS. 6 and 7. The sub-chassis 8 includes side walls 8a and 8b facing each other and has a substantially U-shaped cross-section, and is secured to the back of the lid 7. A disk drive 9 is elastically connected to the sub-chassis by the damper. The damper comprises four rubber grommets 10 inside of the side walls of the sub-chassis 8, as shown in FIG. 7. The disk drive 9 includes a disk drive frame 12 having a cartridge inserting/extracting port 12a through which a disk cartridge 11 is inserted or extracted. The disk drive frame 12 moves inside and outside of the disk unit 6 by rotating the lid 7.

As shown in FIG. 8, the disk drive includes a spindle motor 13 for rotating a disk 11a in the disk cartridge 11, an optical pickup device 14 for reading and writing data to and from the disk 11a, and a pickup device actuator (not illustrated) for moving the optical pickup device 14 forward and backward in a tracking direction, to allow the optical pickup device to read the tracks on the optical disk.

Damper elements 10 in FIG. 8 function as elastic insulators.

In operation, the disk cartridge 11 is inserted into or extracted from the disk drive frame 12 by rotating the lid 7 in the direction of arrow $m_1$ or $m_2$ in FIG. 6. The rotating of the lid 7 opens or closes the aperture 6a of the disk unit frame 6.

With such a conventional optical disk unit, to protect the disk drive 9 from vibrations and impacts when recording and reproducing data, the disk drive 9 must be secured elastically to the sub-chassis 8 (thereby increasing an allowable amplitude), so that the primary resonance frequency of the disk drive frame 12 is optimally decreased.

However, to increase the disk drive's ability to absorb vibrations (e.g., increasing the allowable amplitude), more movement/compensation (e.g., "play") must be provided between the disk drive 9 and the sub-chassis 8. However, such excess movement prevents the disk cartridge 11 from being smoothly inserted into or extracted from the disk drive frame 12, since the sub-chassis is not fixed (e.g., is movable) during insertion of the disk cartridge.

Hence, a trade-off exists between the ease of insertion/extraction and the ability to absorb vibrations. A conventional disk drive which readily absorbs vibrations is problematic in the disk insertion/extraction operations because of the excessive freedom of movement. While a disk drive that is relatively stable (e.g., fixed) allows easy insertion/extraction of the disk, such a disk drive will not absorb vibrations as readily. Therefore, conventional disk drives are built to compromise (e.g., trade-off) these mutually exclusive objectives. Vibrations exhibited by such a conventional structure are illustrated in FIG. 9.

Specifically, FIG. 9 shows a disk rotating frequency transfer function curve (e.g., frequency of vibration) "a" of an optical disk (at a revolution speed of 70 rps) in the focus direction of the optical disk. The focus direction of the optical disk is the direction perpendicular to the tracks of the optical disk and opposed to the objective lens.

The lens actuator movement transfer function of an objective lens actuator of an optical pickup device is shown by curve "b", frequency curve "c" is a damping mechanism transfer function according to the mass characteristic law (e.g., where $m\ddot{u}+c\dot{u}+ku=f(t)$, thereby representing the damping mechanism transfer function), an actual frequency of the disk drive when elastically holding a disk drive by a rubber grommet is shown by frequency curve "d", and a spectrum curve of the disk drive when an external vibration is applied is shown by curve "e". g1 and g2 represent frequency "spikes" showing outside (external) shock imparted to the system, and represent harmful frequencies to the system.

Thus, curve "a" is the disk rotation frequency transfer function curve, curve "b" is a lens actuator movement transfer function, curve "c" is a damping mechanism transfer function, curve "d" is another damping mechanism transfer function, and curve "e" represents when an external vibration is applied to the disk drive.

As shown in FIG. 9, the two large waveforms ("spikes") g1, g2 appear in the frequency area at an optical-disk revolution speed of approximately 70 rps or less, and the amplitudes of these vibrations have values exceeding the frequency curve "d." Thus, FIG. 9 illustrates that the vibration-resistant structure of conventional disk units (e.g., the grommets 10) are insufficient to maintain such vibrations below the frequency curve "d."

As a result, the lens and lens actuator do not operate reliably, and the disk drive unit cannot perform high-quality data recording and reproduction, and for smoothly inserting and extracting a disk cartridge in and from a disk unit, and in which the lens and lens actuator operate reliably.

SUMMARY OF THE INVENTION

In view of the foregoing and other problems of the conventional systems, an object of the present invention to provide a structure for performing high-quality data recording and reproduction, and for smoothly inserting and extracting a disk cartridge in and from a disk unit.

In a first aspect, a disk drive according to the present invention includes a disk drive frame, a chassis, and a disk cartridge is elastically secured to a chassis through the disk drive frame, wherein a locking plate moves the disk drive to a first (e.g., locking) position and the disk drive frame is returned to a second (e.g., unlocked) position by a damping mechanism (e.g., a spring).

Therefore, the disk drive is moved to a locking position and is locked due to first (e.g., forward) movement of the locking plate when the disk cartridge is inserted or extracted and unlocked due to second (e.g., backward) movement of the locking plate when data is to be recorded or reproduced.

With the unique and unobvious structure of the invention, the disk drive is positioned in a locking position by being pressed against the chassis. Further, a plurality of through-hole openings are preferably provided on the surface and the back of a locking plate, and guides guide the locking plate and are insertable into the through-holes.

A securing recess opening and a securing protrusion are provided, and a cushioning material is provided between a securing recess and a securing protrusion. The securing recess and the securing protrusion are tapered for allowing each to be fitted together. A locking plate is movable forward and backward by driving a cam mechanism, with the cam mechanism having two pairs of rotary cams contacting the locking plate. Each pair of rotary cams is connected to a solenoid through a linkage.

With the invention, the primary resonance frequency of the disk drive frame is set to a value smaller than the primary resonance frequency of the objective lens actuator. As a result, the present invention provides a structure for performing high-quality data recording and reproduction, and for smoothly inserting and extracting a disk cartridge in and from a disk unit, and in which the lens and lens actuator operate reliably.

BRIEF DESCRIPTION OF THE DRAWINGS

The foregoing and other objects, aspects and advantages will be better understood from the following detailed description of a preferred embodiment of the invention with reference to the drawings, in which:

FIG. 6 is a perspective view of a conventional disk unit;

FIG. 7 is a perspective view of the conventional disk drive;

DETAILED DESCRIPTION OF A PREFERRED EMBODIMENT OF THE INVENTION

Figure 1:
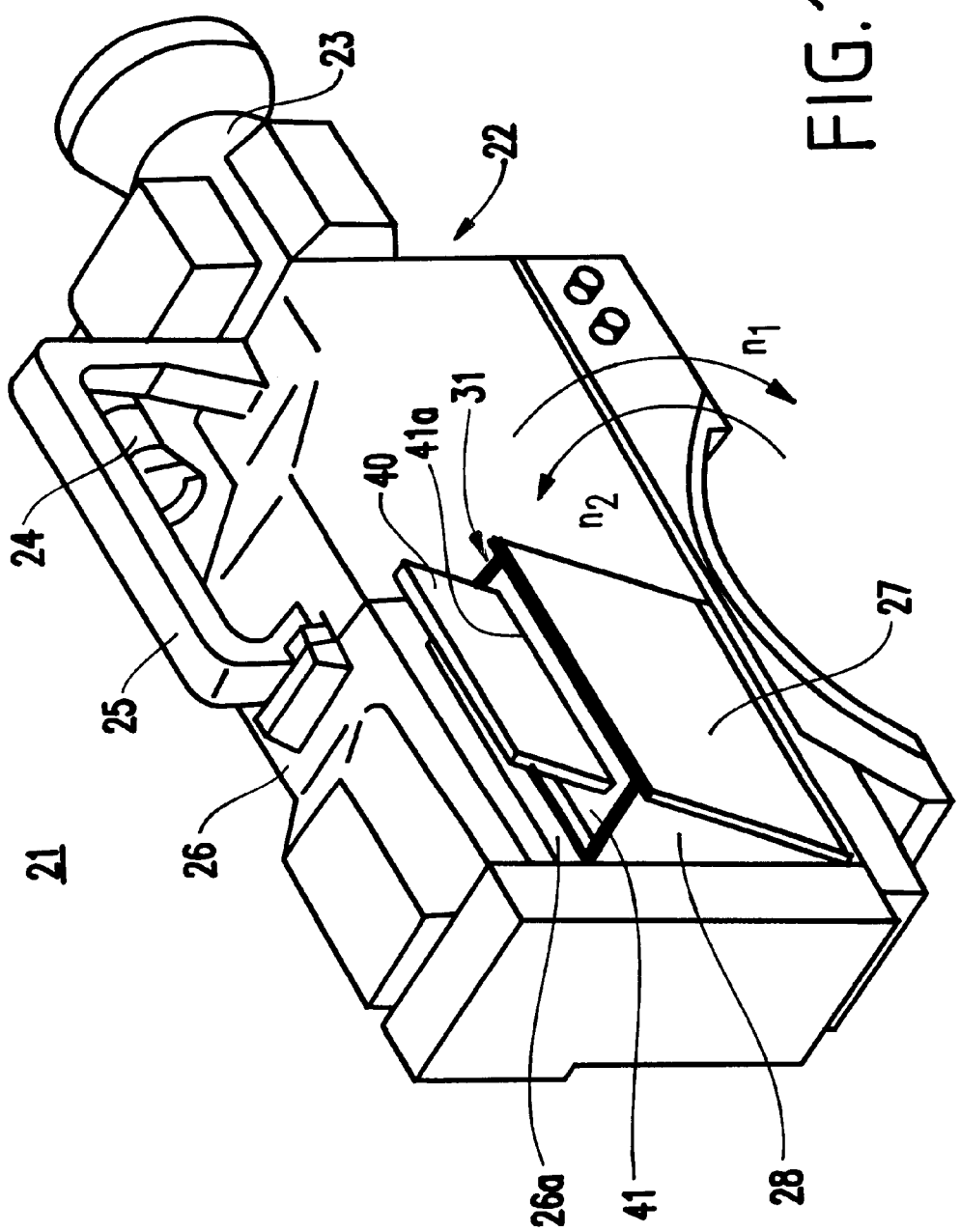
FIG. 1 is a perspective view of a case of the disk unit of the present invention.

Referring now to the drawings, and more particularly to FIGS. 1–5, a disk drive of the disk unit according to the present invention is illustrated.

First, referring to FIG. 1, a portable video camera 21 is illustrated that includes a camera body 22, a lens barrel 23, a viewfinder 24, and a carrying handle 25. The camera body 22 has a disk unit frame 26 and a lid cover for opening or closing an aperture 26a of the disk unit frame 26. The cover 27 opens to allow a disk 40 to be inserted (or removed) from a port (e.g., slot) 41a of a disk drive 31.

Figure 2:
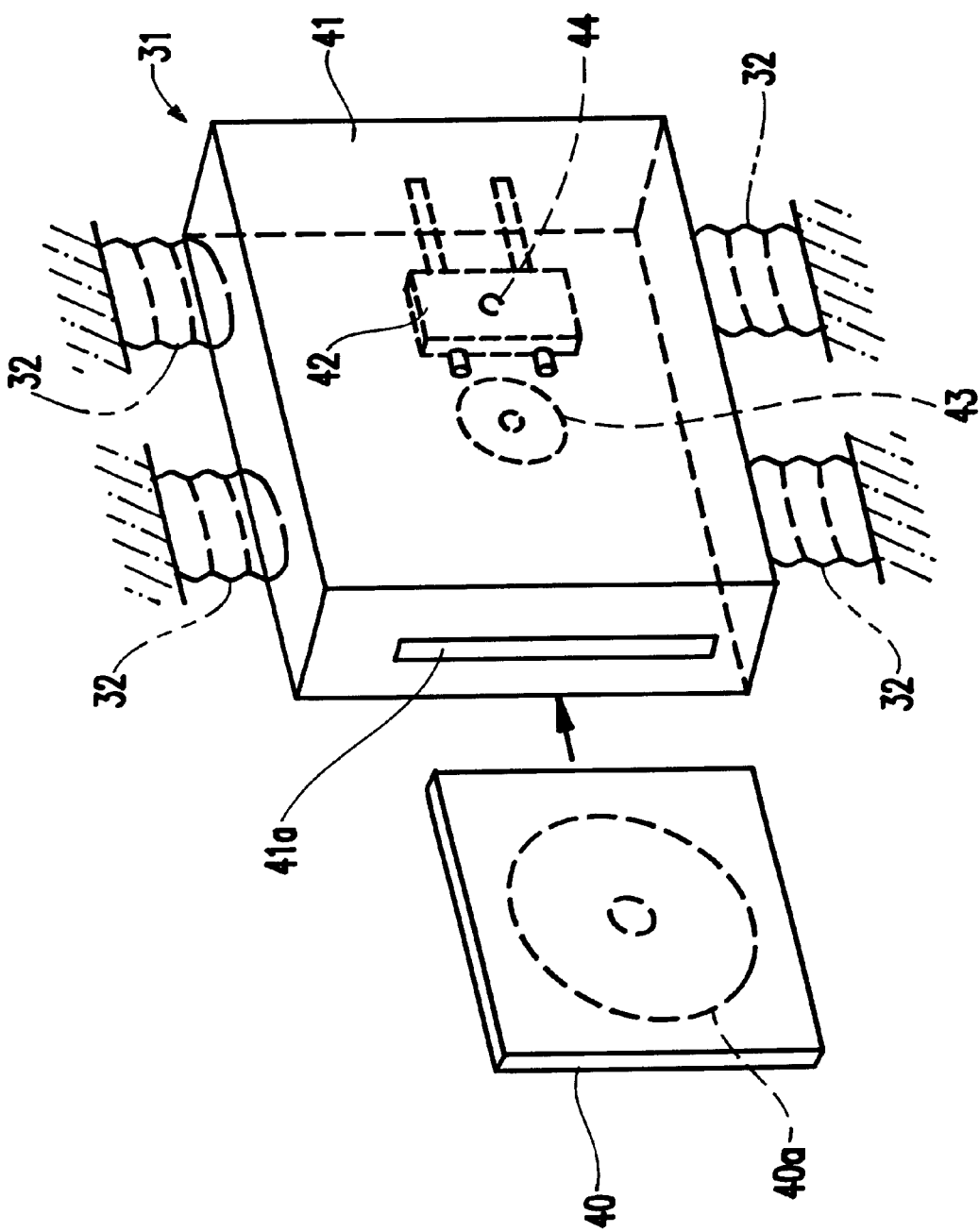
FIG. 2 is a perspective view of a disk drive of the present invention.

As better shown in FIG. 2, a pickup device 44 and a printed circuit board (not illustrated) are built into the disk unit frame 26. Referring back to FIG. 1, the cover 27 is connected to the main chassis (not illustrated), so as to be rotatable in the directions shown by arrows $n_1$ and $n_2$. A box-type sub-chassis 28 serves as a disk drive setting chassis, and is secured to the back of the cover 27.

Figure 3:
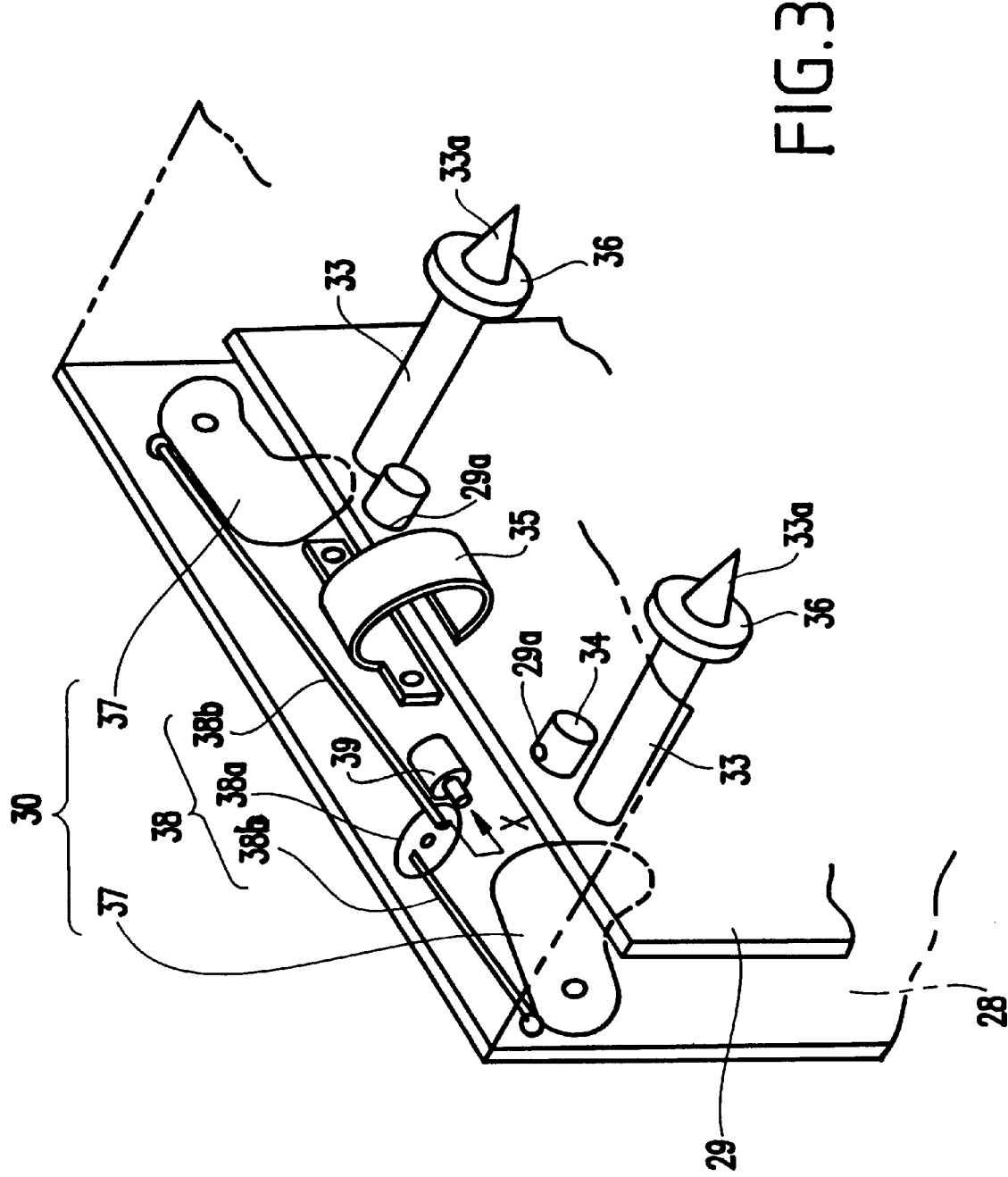
FIG. 3 is a perspective view of a locking plate according to the present invention.

As shown in FIG. 3, a locking plate 29, preferably formed of stainless steel, plastic (PPS) or the like, is positioned in the sub-chassis 28. The locking plate 29 is movable, for example, by a cam mechanism 30, in the direction shown by an arrow $O_1$ (FIG. 4(b)), thereby to lock the disk 40 within the disk drive 31.

Figure 4A:
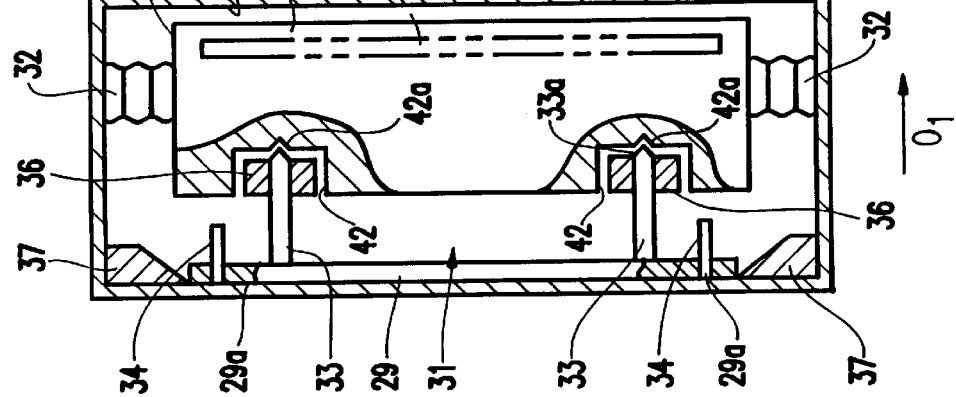
FIG. 4(a) is a sectional view of the locked state of the disk drive according to the present invention.
Figure 4B:
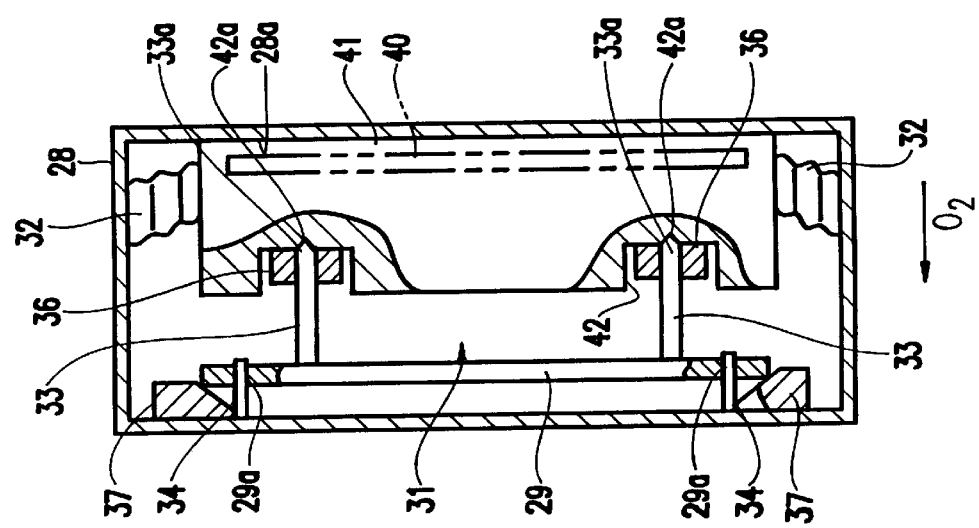
FIG. 4(b) is a sectional view of the unlocked state of the disk drive according to the present invention.

As shown in FIGS. 4(a) and 4(b), the disk drive frame 41 is elastically held by insulators 32. Insulators 32 preferably include, for example, rubber grommets or the like. The disk drive frame 41 can freely move between a first position and a second position because of the elastic insulators 32. For example, the disk drive frame 41 can freely move between a locked position (as shown in FIG. 4(a)) and an unlocked position (as shown in FIG. 4(b)) because of the elastic insulators (e.g., damping mechanisms) 32.

As shown in FIG. 4(a), when the disk drive frame 41 is pressed against the inner wall of the sub-chassis 28, the disk drive frame 41 is securely held in place, to allow easy insertion and removal of the disk 40. Hence, since the disk drive frame 41 is securely held in place, it will not move when the user attempts to insert and/or remove the disk. To the contrary, with the conventional structure illustrated in FIGS. 6 and 7, the rubber grommets 10 are provided for purposely and affirmatively allowing the disk drive 9 to move, which makes it difficult to insert and/or remove the disk, as discussed above.

The locking plate 29 moves the disk drive 31 to a first position (e.g., the locked position as shown in FIG. 4(a)). Pressing pins 33, preferably formed of metal, serve as securing protrusions and are preferably integrally provided at one side of the plate 29. While only two pressing pins are illustrated in the Figures, the structure could include additional pressing pins, as specific applications require. Conversely, while a plurality of pressing pins are preferred, a single pressing pin could be provided and the invention would still be operable.

Through-holes 29a extend through the back of the locking plate 29, and guides 34, for guiding and aligning the locking plate 29 along a substantially linear path, are movably fitted through the through-holes 29a. It is noted that, while a plurality of guides and through-holes are preferred, a single guide and through-hole could be provided and the invention would still be operable. The locking plate 29 is biased in the direction shown by an arrow $O_2$ (e.g., see FIG. 4(a)) by a flat spring 35 or the like. While a spring 35 is illustrated, any biasing member could be used in place of the spring 35 such as a rubber grommet or the like.

Tapered cones 33a are formed on the front end of the pressing pins 33, and a cushioning material 36 (such as, for example, rubber, sponge, or the like) is placed on each of the tapered cones 33a for moderating the impact when the locking plate 29 contacts the disk drive frame 42., The tapered shape of the cones assists in alignment of the cones 33a with a recess 42a further described below, and also allows better and more secure gripping of the disk drive unit.

The cam mechanism 30 preferably includes one or more pairs of rotary cams 37, each having a tapered portion for receiving first and second sides of the locking plate 29. Each pair of rotary cams 37 is connected to a solenoid 39 through a linkage 38 having a rotary link 38a and first and second oscillating links 38b. For each pair of rotary cams 37, the cams rotate in opposite directions whenever the solenoid 39 moves. The locking plate 29 moves in the direction of arrow $O_1$ (e.g., see FIG. 4(b)) due to the operation of the solenoid 39 and the rotation of the cams 37, and moves in the opposite direction (e.g., see arrow $O_2$ shown in FIG. 4(a)) due to the force of the flat spring 35.

As shown above, a cam mechanism 30 comprising rotary cams 37 is preferably used as a locking plate driving mechanism. However, the present invention is not restricted to such a mechanism. It is also possible to obtain the same function as that of the foregoing embodiment by using, for example, a cam mechanism comprising a cam groove and a pin, or a manual mechanism or the like.

As shown in FIG. 2, the disk drive 31 includes a disk drive frame 41 having a cartridge insertion/extraction port 41a for receiving a disk cartridge 40. The disk drive frame 41 is locked in position due to the pressure between the locking plate 29 and the inner surface 28a of the sub-chassis 28 by the operation of the solenoid 39 and cams 37 (as shown in FIG. 4(a)). As shown in FIG. 4(b), the disk drive frame 41 is placed in an unlocked position due to the force of the flat spring 35 (e.g., the spring 35 being shown in FIG. 3).

The force generated by the solenoid 39 is greater than the force of the spring 35, such that when the solenoid is activated, the disk drive frame 41 is forced into and remains in the locked position. When the solenoid is deactivated, the disk drive frame 41 moves to and remains in the unlocked position because of the force of the spring 35.

The solenoid 39 operates when an actuating mechanism (e.g., button, switch, etc.) is actuated by the operator.

Referring again to FIGS. 4(a) and 4(b), a securing recess 42 includes a tapered cone receiving portion 42a. The tapered cone receiving portion 42a has a funnel-shaped cross-section, for receiving the tapered cone 33a of the pressing pin 33 according to the movement of the locking plate 29. As mentioned above, the tapered shape of the cones 33a and that of the tapered cone receiving portion 42a help to align the cones with the portion 42a, thereby to provide an easy and more secure "fit".

As shown in FIG. 2, the disk drive frame 41 contains a spindle motor 43 for rotating the disk 40a in the disk cartridge 40, an optical pickup device 44 for reading and writing data to and from the disk 40a, and an optical-pickup-device actuator 42 for moving the optical pickup device 43 (e.g., such as an objective lens) toward and away from the center of the disk 40a, so that the optical pickup device 43 can read/write to all the tracks on the disk.

Figure 4C:
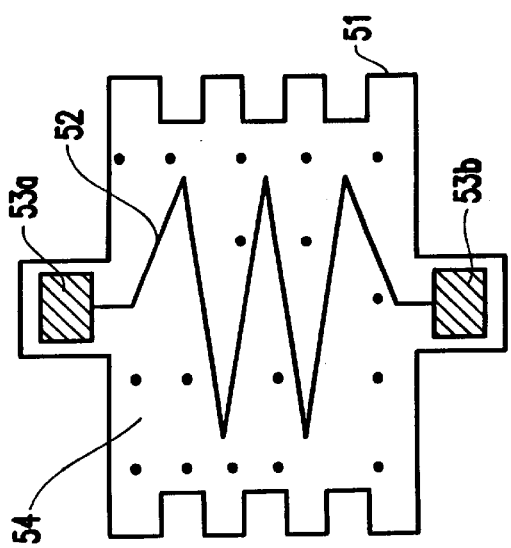
FIG. 4(c) illustrates an alternative embodiment of a damping mechanism 32 of the disk drive.

While the elastic insulators are described above as preferably being formed of rubber grommets, FIG. 4(c) illustrates an alternative embodiment of the elastic insulators 32 functioning as the damping mechanism. Such a structure helps overcome (e.g. reduce) the peak gain of the damping mechanism frequency.

In FIG. 4(c), the elastic insulators 32 each are formed of a rubber container 51 (e.g., a "sack" or the like) is provided housing a coiled metal spring 52 therein. The spring 52 is connected to the sack 51 at first and second ends thereof by fixing portions 53a, 53b. A damping fluid such as silicon gel 54 is provided surrounding the metal spring within the sack. Around the periphery of the sack are a plurality of grooves for allowing the sack to freely move and compress, thereby providing a suitable damping characteristic. As mentioned above, such a structure helps overcome (reduce) the peak gain of the damping mechanism frequency. It is noted that while the invention is primarily directed to preventing low frequency vibrations/shocks, the concept and principles of the invention could be applied suitably to preventing high frequency vibrations/shock.

Preferably, at least three damping members are provided for the disk drive unit, with a first damping member being on a first side of the disk drive unit and second and third damping units being on a second side of the disk unit opposed to the first side. The range of the damping characteristic (and spring constant) selected depends on the mass of the disk drive unit.

Figure 4D:
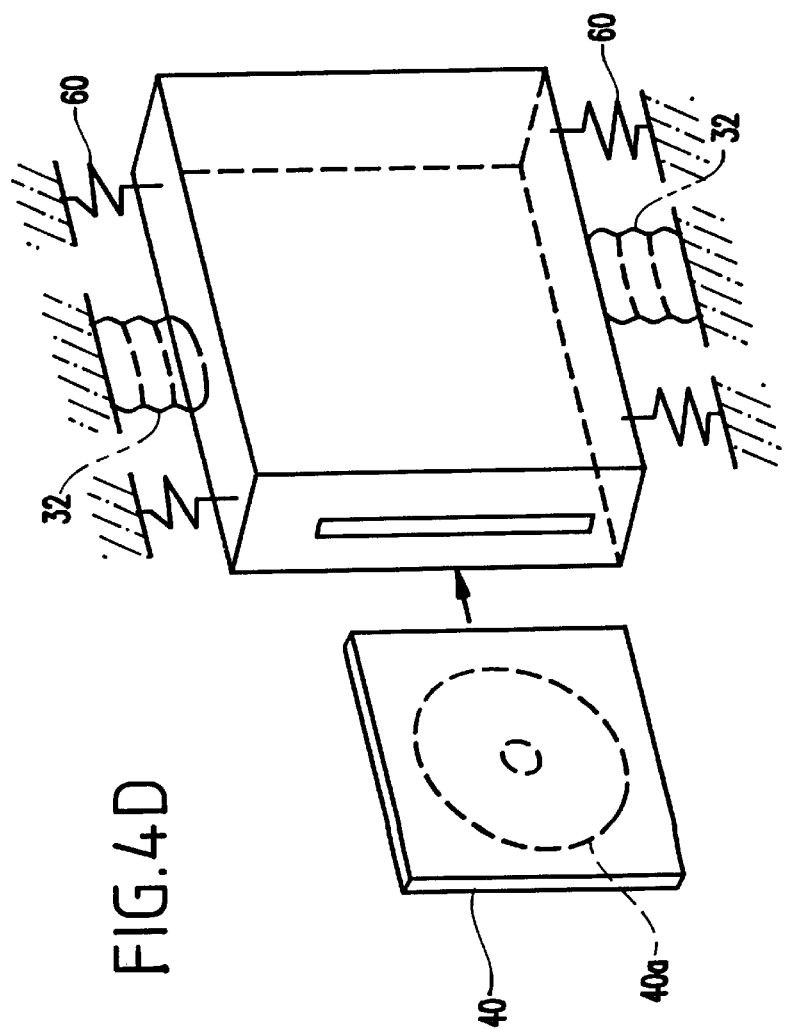
FIG. 4(d) illustrates an arrangement of the damping mechanism in the present invention.

In a different configuration of the arrangement of the damping mechanisms, on opposed external sides of the disk drive unit, a damping mechanism 32 as described above could be employed with first and second springs 60 on first and second sides of the damping mechanism 32 as shown in FIG. 4(d).

Figure 5:
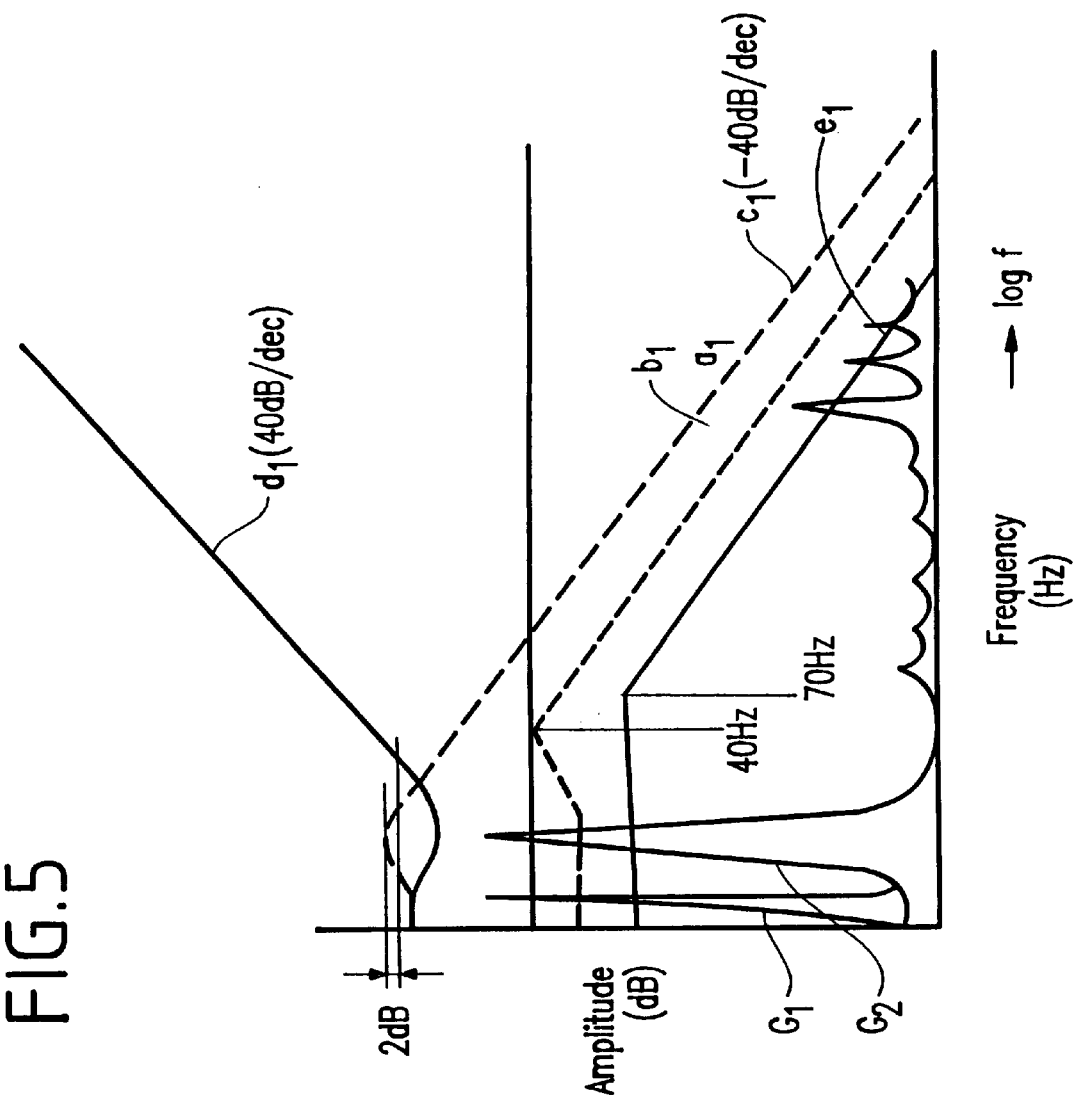
FIG. 5 illustrates frequency characteristic curves of the disk unit according to the present invention.
Figure 8:
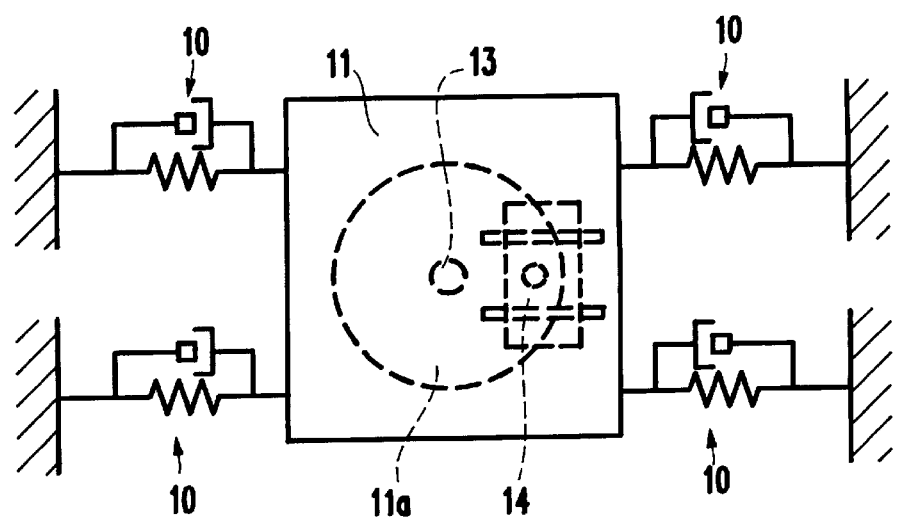
FIG. 8 illustrates the conventional disk unit mounted to a sub-chassis.

The primary resonance frequency of the disk drive 31 is preferably set to a value smaller than the primary resonance frequency of the actuator for the optical pickup device. FIG. 5 shows the transfer curve (e.g., amplitude of vibration) $a_1$ of the optical disk (at a revolution speed of 70 rps (Hz)) in the optical-disk focus direction, transfer curve $b_1$ of the objective lens actuator of the optical pickup device, frequency curve $c_1$ according to the mass characteristics law, actual frequency curve $d_1$ when elastically securing the disk drive to the chassis by the insulator, and spectrum curve $e_1$ when an external vibration is applied.

Figure 9:
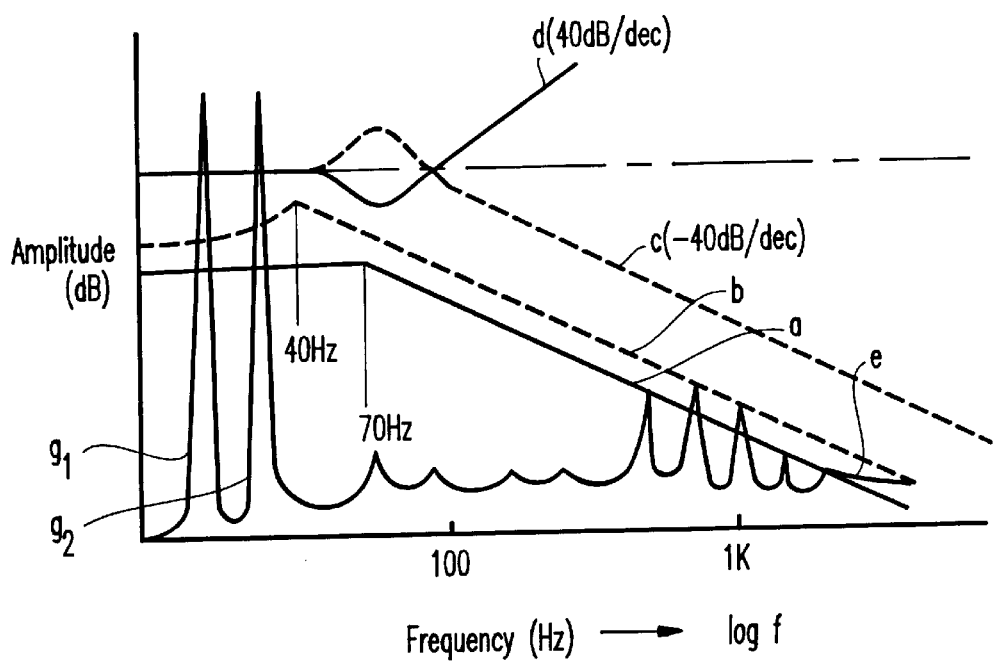
FIG. 9 illustrates frequency characteristic curves of the conventional disk unit.

FIG. 5 illustrates that two large waveforms (spikes) $G_1$ and $G_2$ appear below the frequency range of 70 rps (Hz) of the optical disk. However, the amplitudes of the vibrations do not exceed the frequency characteristic $d_1$, as in the conventional system discussed above with regard to FIG. 9. Therefore, optimum vibration-resistant and impact-resistant characteristics can be obtained by the insulator and the structure of the present invention. For example, the invention can overcome over 1.5 G vibration forces, with the spring constant equal to 3 G. Hence, the present invention overcomes the harmful frequency spikes $g_1$ and $g_2$, so that the disk drive unit (and specifically the lens and lens actuator) can operate properly.

Thus, with the invention, the locking plate 29 moves the disk drive frame 41 to lock the disk drive frame 41 against the sub-chassis 28. The disk drive frame 41 returns to the unlocked position by the action of the spring 35. The disk drive frame 41 is moved to a locked position due to forward movement of the locking plate 29, and is locked when inserting or extracting a disk cartridge and unlocked when recording or reproducing data.

Therefore, optimum vibration-resistant and impact-resistant characteristics of the disk drive is obtained when recording or reproducing data, and an adequate locking force is obtained when inserting or extracting a disk cartridge. Thus, the inventive structure allows high quality recording or reproducing and smooth insertion or extraction of the disk cartridge.

Specifically, the primary resonance frequency of the disk drive frame is set to a value smaller than the primary resonance frequency of the objective lens actuator. As a result, the present invention provides a structure for performing high-quality data recording and reproduction, and for smoothly inserting and extracting a disk cartridge in and from a disk unit, and in which the lens and lens actuator operate reliably.

While the invention has been described in terms of a preferred embodiment, those skilled in the art will recognize that the invention can be practiced with modification within the spirit and scope of the appended claims.

While the above invention has been discussed with respect to a portable camera (e.g., such as a video camera), those skilled in the art will recognize that the invention can also be applied, not only to a portable video camera, but also to other similar disk units.

Further, while a disk drive unit has been described above preferably comprising an optical disk drive unit, other disk drive units using different types of media could be employed advantageously.

Additionally, the invention could be used advantageously in an automobiles video disk recorder or an airplane's video disk recorder.

Moreover, while the invention is primarily directed to preventing low frequency vibrations/shocks, the concept and principles of the invention could be applied suitably to preventing high frequency vibrations/shock.

Having thus described my invention, what I claim as new and desire to secure by Letters Patent is as follows:

1. A disk unit comprising:
   a disk drive frame;
   a locking plate, connected to said disk drive frame, for moving said disk drive frame to a first position;
   a spring, connected to said locking plate, for moving said disk drive frame to a second position opposite that of said first position; and
   a chassis elastically secured to said disk drive frame,
   wherein said locking plate includes at least one through-hole and said chassis includes at least one guide for being fitted into said at least one through-hole for guiding said locking plate along a substantially linear path.

2. The disk unit as in claim 1, wherein said locking plate includes at least one securing protrusion extending toward said disk drive frame and said disk drive frame includes at least one securing recess for receiving said at least one securing protrusion.

3. The disk unit as in claim 2, further comprising a cushioning material positioned between said at least one securing recess and said at least one securing protrusion.

4. The disk unit as in claim 2, wherein said at least one securing protrusion has a tapered end, and said at least one securing recess has a tapered shape for allowing said at least one securing protrusion to engage said at least one securing recess.

5. The disk unit as in claim 1, further comprising a cam mechanism for actuating said locking plate.

6. The disk unit as in claim 5, wherein said cam mechanism comprises at least one pair of rotary cams for biasing said locking plate.

7. The disk unit as in claim 1 further comprising:
   a cam mechanism for actuating said locking plate, wherein said cam mechanism comprises at least one pair of rotary cams for biasing said locking plate; and
   a linkage connected to said at least one pair of rotary cams, and a solenoid connected to said linkage.

8. The disk unit as in claim 1, further comprising an actuator connected to said disk drive frame and an objective lens connected to said actuator,
   wherein said disk drive frame has a first primary resonance frequency and said actuator has a second primary resonance frequency, said first primary resonance frequency being less than said second primary resonance frequency.

9. The disk unit as in claim 1, further comprising means, coupled to said disk drive frame, for overcoming a peak gain frequency of said disk drive frame.

10. A disk unit comprising:
    a disk drive frame;
    a locking plate, connected to said disk drive frame, for moving said disk drive frame to a first position:
    a spring, connected to said locking plate, for moving said disk drive frame to a second position opposite that of said first position;
    a chassis elastically secured to said disk drive frame, wherein said first position comprises a locked position and said second position comprises an unlocked position and wherein said disk drive frame is pressed against said chassis by said locking plate in said locked position; and
    means, coupled to said disk drive frame, for overcoming a peak gain frequency of said disk drive frame,
    wherein said means for overcoming a peak gain frequency of said disk drive frame, comprises a damping mechanism, said damping mechanism comprising:
    a rubber container;
    a spring coupled within said container; and
    a silicon gel surrounding said spring within said container.

11. A disk unit comprising:
    a disk drive frame;
    a locking plate, connected to said disk drive frame, for moving said disk drive frame to a first position:
    a spring, connected to said locking plate, for moving said disk drive frame to a second position opposite that of said first position;
    means, coupled to said disk drive frame, for overcoming a peak gain frequency of said disk drive frame, wherein said means for overcoming a peak gain frequency of said disk drive frame comprises a damping mechanism, said damping mechanism comprising:

a rubber container, a spring coupled within said container, and a silicon gel surrounding said spring within said container wherein said means for overcoming a peak gain frequency of said disk drive frame further includes first and second springs coupled to said disk drive frame with said damping mechanism therebetween.

12. An apparatus having a recording medium drive for reading and writing data to a recording medium, comprising:

a holder for holding said recording medium, said holder comprising a recording medium drive frame;

a chassis elastically coupled to said recording medium drive frame;

a fastener for elastically securing said holder to said chassis;

a locking plate for locking said recording medium drive frame in a first position; and an actuator connected to said chassis for making said locking plate be connected to said recording medium drive frame, to press said recording medium drive frame against said apparatus and to prevent said recording medium drive frame from moving with respect to said apparatus in said first position, wherein said locking plate includes projections, and said chassis includes recesses for receiving said projections, and wherein said projections press against said recesses to lock said locking plate against said apparatus.

13. The apparatus as in claim 12, wherein said fastener comprises a plurality of rubber grommets.

14. The apparatus as in claim 12, wherein said locking plate is connected to said recording medium drive frame, and presses said recording medium drive frame against said apparatus and prevents said recording medium drive frame from moving with respect to said apparatus, said apparatus further comprising:

a chassis elastically coupled to said drive frame;

at least one solenoid connected to said chassis for producing a force;

a linkage connected to said solenoid for transmitting said force; and at least one cam connected to said linkage for transmitting said force to said locking plate.

15. The apparatus as in claim 12, wherein said holder includes a recording medium opening, wherein said locking plate locks said holder in position when said recording medium opening is in a first position, and unlocks said holder when said recording medium opening is in a second position.

16. The apparatus as in claim 12, wherein said locking plate includes a cushioning material for contacting said recording medium drive frame.

17. The apparatus as in claim 12, wherein said locking plate is connected to said recording medium drive frame, and presses said recording medium drive frame against said apparatus and prevents said recording medium drive frame from moving with respect to said apparatus, wherein said locking plate includes at least one guide hole and said apparatus includes at least one guide, and wherein said at least one guide moves said locking plate in a substantially linear path.

18. The apparatus as in claim 12, further comprising means, coupled to said fastener, for overcoming a peak gain frequency of said fastener.

19. An apparatus having a recording medium drive for reading and writing data to a recording medium, comprising:

a holder for holding said recording medium, said holder comprising a recording medium drive frame:

a chassis elastically coupled to said recording medium drive frame;

a fastener for elastically securing said holder to said chassis:

a locking plate for locking said recording medium drive frame in a first position;

an actuator connected to said chassis for making said locking plate be connected to said recording medium drive frame, to press said recording medium drive frame against said apparatus and to prevent said recording medium drive frame from moving with respect to said apparatus in said first position; and means, coupled to said fastener, for overcoming a peak gain frequency of said fastener, wherein said means for overcoming a peak gain frequency of said fastener, comprises a damping mechanism, said damping mechanism comprising:

a rubber container;

a spring coupled within said container; and a silicon gel surrounding said spring within said container.

\* \* \* \* \*